Feb. 28, 1928.

W. F. RENNIE 1,661,090

METHOD AND APPARATUS FOR APPLYING STRIP MATERIAL TO ANNULAR ARTICLES

Filed Aug. 4, 1923   2 Sheets-Sheet 1

Inventor
William F. Rennie.
By Robert McPherson
Atty.

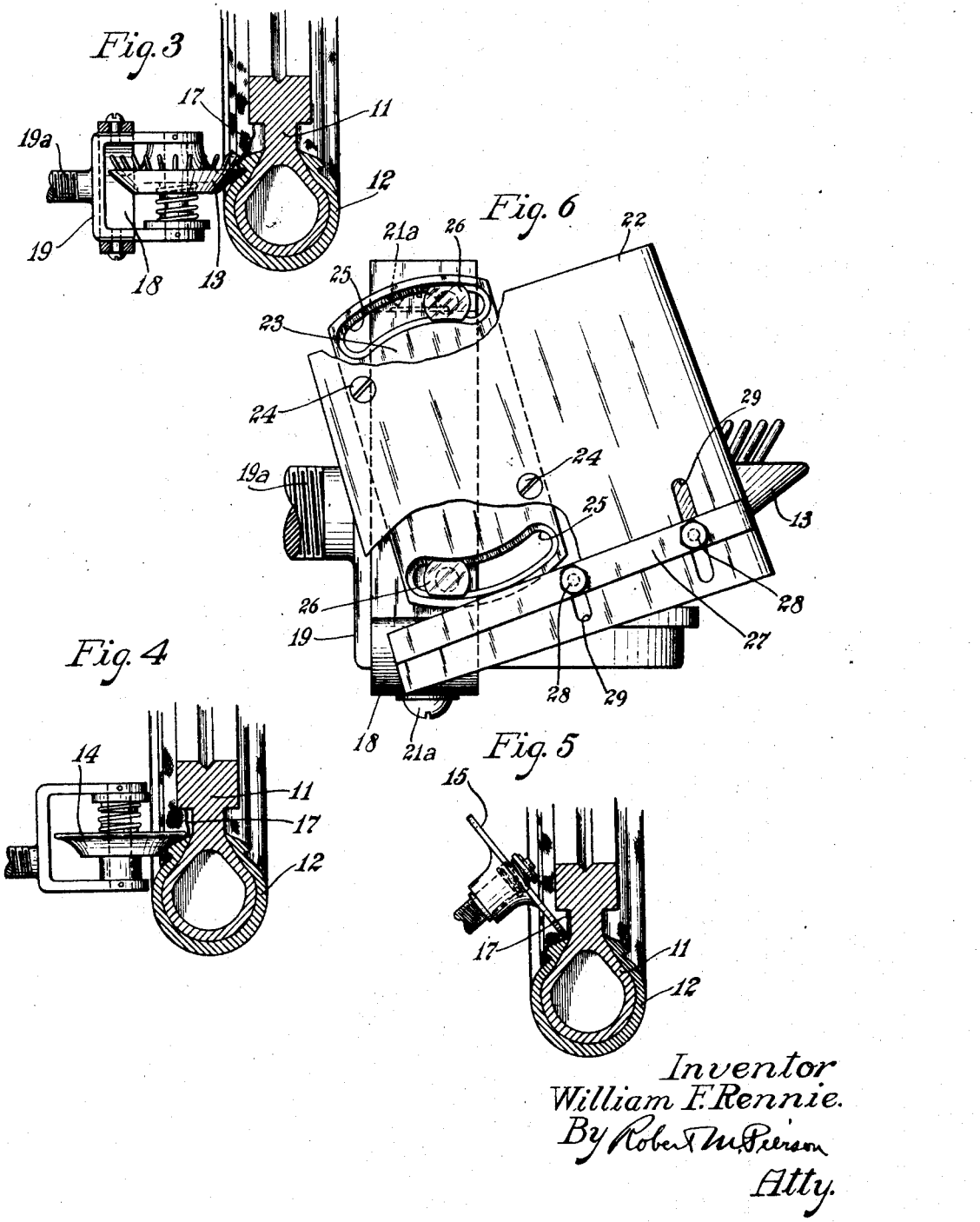

Patented Feb. 28, 1928.

1,661,090

UNITED STATES PATENT OFFICE.

WILLIAM F. RENNIE, OF AKRON, OHIO, ASSIGNOR TO THE B. F. GOODRICH COMPANY, OF NEW YORK, N. Y., A CORPORATION OF NEW YORK.

METHOD AND APPARATUS FOR APPLYING STRIP MATERIAL TO ANNULAR ARTICLES.

Application filed August 4, 1923. Serial No. 655,596.

This invention relates to methods and apparatus for applying strip material to a side face of an annular article, an example being the applying of bias-cut, rubberized-fabric, finishing strips to pneumatic tires.

In the manufacture of such tires a common practice is to cover each bead portion of the tire carcass with a strip of bias-cut fabric, said strip running longitudinally along the bead and extending laterally from a line somewhat above or outward from the bead down to the toe of the latter, and said strip also usually is folded back upward onto the inner face of the bead portion of the tire. The strip is thus required to be bent substantially in its own plane, and the rapid laying of the strip has presented a difficult problem, since it is desirable that the strip be laid smoothly and without wrinkles and yet without such high tension as to result in the subsequent breaking thereof, particularly at its elongated outer margin.

Heretofore, so far as I am aware, such strips have been bent to conform to the longitudinal curvature of the side face of the article, such as a tire bead, by being in effect swung laterally about a part thereof previously attached to the article, and by tensioning engagement with the strip at a point thereon remote from the strip's point of attachment to the article, with the result that the inner as well as the outer margin of the strip, at points remote from the article, is stretched, although said inner margin should not be elongated as it passes onto the article.

My general object is to provide improved procedure and apparatus for applying strip material to annular articles, and more particularly for applying finishing strips to tires. More specific objects are to save time and labor, to obtain an accurate laying of the fabric strip, and to do so without buckling and without excessive tension in any part of the strip. I attain these objects by feeding the strip onto the side face of the article and so guiding and tensioning it closely adjacent its point of progressive attachment as to cause it to bend substantially in its own plane and so to be pre-shaped before it passes onto the article, the point of tensioning engagement being so close to said point of attachment that the result described may be produced without at any time subjecting the inner margin of the strip to substantial tension.

Of the accompanying drawings:

Fig. 3 is a horizontal section of the tire core and the work thereon, on line 3—3 of Fig. 1, showing also a presser roller.

Fig. 4 is a similar view showing a second presser roller.

Fig. 5 is a similar view showing a third presser roller.

Fig. 6 is a plan view of parts of the apparatus including a guide for the finishing strip.

Figure 1:
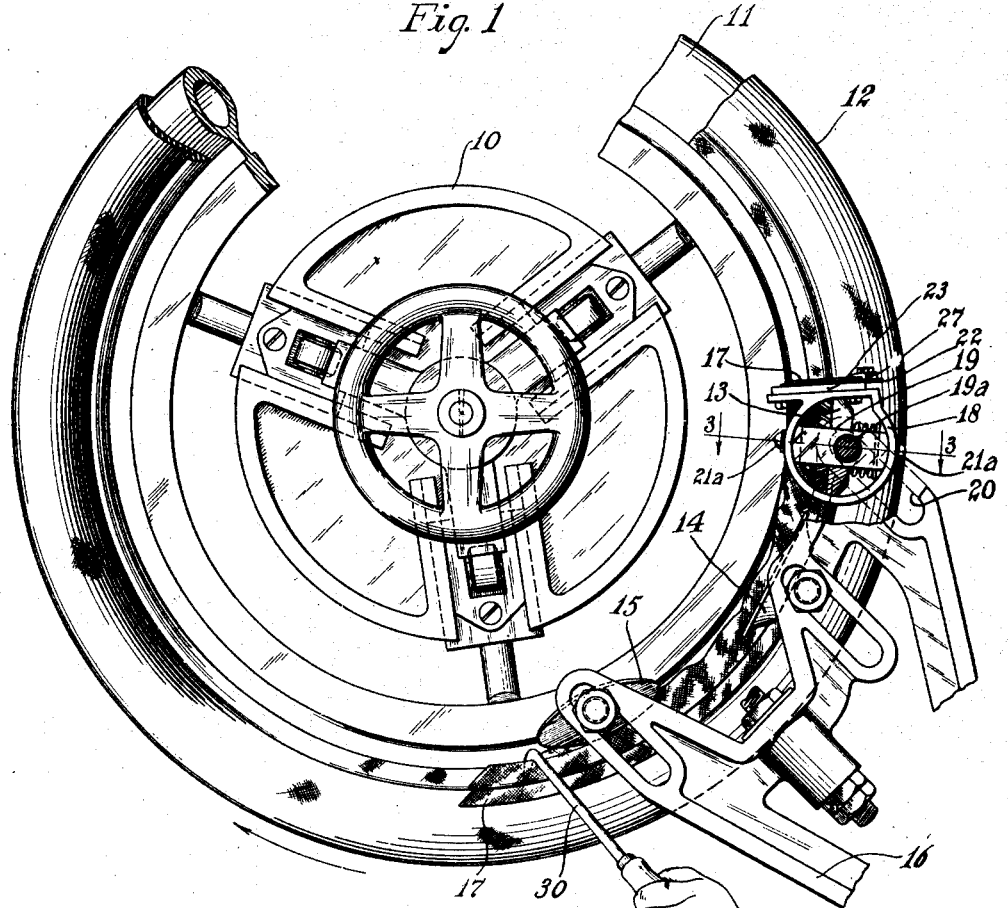
Fig. 1 is an elevation of apparatus embodying and adapted to carry out my invention in its preferred form, and the work in place, parts being broken away and in section.

Referring to the drawings, 10 is the rotatable, core-supporting chuck of a tire-building machine, 11 is the tire core thereon and 12 is a tire carcass built upon said core. 13, 14, and 15 are respective bead-stitching rollers such as heretofore have been used for shaping and pressing the carcass plies about the bead of the tire, said rollers being mounted upon an arm 16 adapted to be held toward the work by means heretofore familiar in the art and therefore not shown or further described herein.

The bias-cut finishing strip is shown at 17. The means for guiding and tensioning said strip comprises an annular supporting bracket 18 encircling the two arms of a yoke 19, between which arms the bead-stitching roller 13 is journalled, said yoke being clamped to the arm 16 by its threaded stem 19ª, the latter being mounted in a slot 20 in said arm and provided with a suitable clamping nut (not shown) so that the yoke may be secured at different distances from the axis of rotation of the work to hold the roller 13 and the guiding and tensioning device in proper position for tires of different bead-diameters.

The bead stitching roller 13 is preferably provided with a circumferential series of pins 13ª, 13ª extending generally toward the axis of rotation of the tire core and diverging from each other as shown, said pins being adapted to engage the finishing strip at spaced intervals and bend it laterally about the salient of the bead with a forward wiping motion, greatest toward the free ends of the pins, so as to exert a longitudinal compressing force upon the finishing strip to contribute to the shortening of its inner margin which is essential to its being fitted onto the bead, and to stick it firmly to the salient of the bead at spaced intervals so that it will not be gathered in a progressively enlarging wave in later rolling operations, the operation of the pins being somewhat in the nature of a fluting action, but having a fluting effect so small that subsequent rolling completely conforms the finishing strip to the bead.

The annular bracket 18 is formed at opposite sides with slots, one being shown at 21 (Fig. 2), in which are mounted respective screws 21ª, 21ª, threaded into the arms of the yoke 19, the bracket thus being adapted to be secured by said screws in different angular positions about the yoke to vary the lateral tilt of a guiding and tentioning plate 22 secured on said bracket.

Between said plate 22 and said bracket is a clamping plate 23, on which the plate 22 is secured by screws 24, 24, said clamping plate being formed with a pair of arcuate slots 25, 25, countersunk at the upper side of the plate to accommodate the heads of respective bolts 26, 26, mounted in said slots, by which bolts the plate 23 is secured to the bracket 18, said plate being thus adapted to be secured in different angular positions about a vertical axis to vary the angle of the tensioning and guiding plate 22 with relation to the tire.

The plate 22 is turned slightly downward along its margin adjacent the tire, so as to avoid undue abrasion of the finishing strip, and is provided on its upper face with a side-guide bar 27 adjustably secured thereon by bolts 28, 28, mounted in slots 29, 29, in said plate, so that said bar may be secured in such position as to guide the finishing strip 17 onto the tire with its outer edge at the desired distance from the bead of the tire.

The plate 22 is thus adapted to be adjusted about an axis normal to the tire at the side thereof and about an axis extending longitudinally of the tire at the side thereof, and the bar 27 may be adjusted bodily from and toward the axis of rotation of the tire and also angularly adjusted to the extent permitted by tolerance of the bolts 28 in the slots 29. The guiding members are thus adapted to be set in the precise positions essential to the smooth and accurate application of the finishing strip, which depends largely upon the finishing strip being guided very accurately both as to its direction of approach and as to its lateral tilt. The relative tensioning of different parts of the strip partly depends upon the positioning of said plate, the tensioning of the strip as it passes onto the tire being in part effected by the friction of the strip passing over the plate. The proper setting of the guiding means may readily be determined by trial.

In the operation of the apparatus, the parts being in position as shown in the several figures, and the arm 16 being yieldingly urged toward the work as in the case of stitching the bead portions of the carcass plies, the leading end of the finishing strip 17 is led over the plate 22 and stuck to the tire carcass, the outer side margin of the strip being aligned against the guide bar 27. The chuck 10, with the core and tire thereon, is then driven clockwise as viewed in Fig. 1, drawing the finishing strip onto the tire, while said strip is held back by hand, as shown in Fig. 2, with appropriate tension. As the strip is drawn onto the tire it is first pressed along its outer margin and into the bead groove of the tire by the roller 13 and then, by the rollers 14 and 15 at their respective stations, is pressed further about the bead and down to the toe of the latter.

Figure 2:
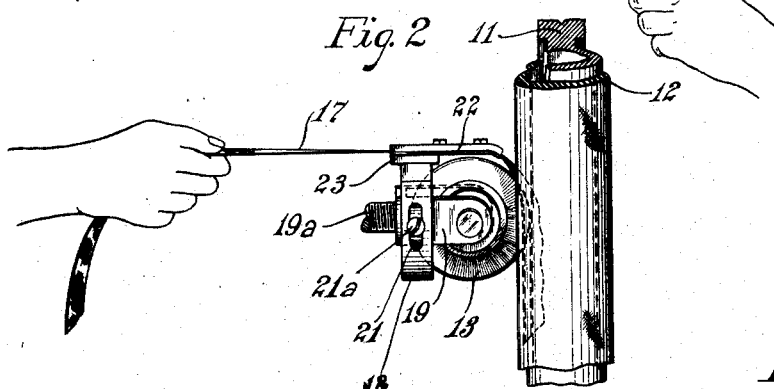
Fig. 2 is a fragmentary elevation of parts of the same as viewed from the right of Fig. 1.

As will best be understood by reference to Figs. 1 and 3, the outer margin of the bias-cut finishing strip is subjected to greater stretch than its inner portion as it passes from the plate 22, because only said outer margin is firmly stuck to the tire as it passes under the roller 13, and because the peripheral speed of the work is greater at the position of said outer margin than at that of the portions of the strip farther inward.

The result is that said outer margin is applied to the tire with such relatively great amount of stretch as to give to the finishing strip a curvature substantially in its own plane, leaving the adjacent part of the strip of such relatively short length as to be pressed about the bead of the tire by the rollers 14 and 15 without wrinkles.

The further folding of the inner margin of the strip under the toe of the tire bead is accomplished by manually holding a hooked tool 30 against toe of the bead as shown in Fig. 1, while the tire is rotated, said tool progressively prying the bead slightly away from the core and progressively folding the inner margin of the strip up under said bead.

The first presser roller 13, being closely adjacent the guide plate 22, the stretch of the finishing-strip resulting from pulling the latter over the plate 22 is more closely localized in the outer margin of the strip than would be the case if said plate and roller were much farther apart, since if they were very widely separated such oblique stretching forces would develop as might result in undue stretching of the inner margin of the strip.

The guide plate 22 and adjacent parts being so related as to cause the strip to pass over the terminal edge of said plate with an abrupt change of direction, a snubbing action is effected, so that the unequal stresses set up in the outer and inner margins of the strip by the rotation of the tire are largely prevented from extending past said plate into the approaching portion of the strip, as would occur if the strip did not turn abruptly about said edge of the plate. The unequal stretching of the strip at its outer and inner margins is thus localized adjacent the strip's point of application, so that a relatively high differential of stretch may be had without unduly stretching the inner margin of the strip.

Modifications of my invention as above described may be resorted to without departing from its scope. While I have described it as related to tire manufacture, it will be understood that the invention applies broadly to any analogous situation including the building up or covering of annular structures generally, and more specifically a concave annular structure.

I claim:

1. The method of applying a strip of sheet material to an annular, laterally-facing surface which comprises feeding the strip onto said surface and progressively pre-shaping it to conform to the longitudinal curvature of said surface as it is so fed, said strip being applied with its outer margin within the limits of said laterally-facing surface and being bent substantially in its own plane without imposing substantial tension upon its inner margin.

2. A method as defined in claim 1 in which the outer margin of the strip is progressively attached to the annular surface in advance of the attachment of inward portions of the strip and in which the bending of the strip is effected by the pull of its attached outer margin.

3. The method of applying an adhesive strip of sheet material to the bead portion of a tire casing which comprises feeding the strip onto said bead portion and progressively pre-shaping it by stretching and bending it substantially in its own plane to conform to the longitudinal curvature of said bead portion without imposing substantial tension upon its inner margin, the outer margin of the strip being applied within the limits of the bead portion of the tire.

4. A method of applying to a side face of an annular article a bias-cut, adhesive fabric strip whose maximum circumference after application is at the edge of the strip, said method comprising feeding the strip onto said face and progressively pre-shaping it to conform to the longitudinal curvature of said face as the strip is so fed, without imposing substantial tension upon the inner margin of the strip.

5. The method of applying an adhesive strip of sheet material to an annular article which comprises attaching a part of the strip to a side face of the article, rotating the article in its own plane, so guiding the strip as to cause it to be drawn onto said face by such rotation, and so tensioning the strip by hold-back engagement therewith closely adjacent its position of progressive attachment as to cause it to be bent substantially in its own plane to assume a longitudinally arcuate form against said face, without imposing substantial tension upon the inner margin of the strip.

6. The method of applying an adhesive fabric strip to an annular article which comprises sticking a part of the strip to a side face of the article, rotating the article in its own plane, so guiding and tensioning the strip by hold-back engagement therewith closely adjacent its position of progressive attachment as to cause it to be drawn, with an abrupt change of direction, onto said side face of the article by the rotation of the latter and so bent substantially in its own plane as to assume a longitudinally arcuate form, and progressively pressing the strip against the article.

7. The method of applying adhesive finishing strips to tires which comprises attaching a part of the strip to the bead portion of the tire, rotating the tire in its own plane, and so guiding and tensioning the strip by hold-back engagement therewith immediately adjacent its position of progressive attachment as to cause it to be drawn onto the bead portion of the tire in longitudinally arcuate form by the rotation of the tire.

8. The method of applying a bias-cut adhesive fabric strip to a side face only of a tire which comprises attaching a portion of the strip to said face, rotating the tire in its own plane, to draw said strip onto the side face thereof, so guiding and tensioning the strip by hold-back engagement therewith closely adjacent its position of progressive attachment as to cause it to be drawn, with an abrupt change of direction, onto said face and so bent substantially in its own plane to assume a longitudinally arcuate form, and progressively pressing the strip against the tire.

9. Apparatus for applying a strip of sheet material to an annular article, said apparatus comprising means for rotating the article in its own plane to draw the strip onto a side face thereof, and means for progressively pre-shaping said strip to conform to the longitudinal curvature of said face as it is so drawn thereonto, said pre-shaping means being adapted to bend the strip in its own plane without imposing substantial tension upon its inner margin.

10. Apparatus for applying a strip of sheet material to an annular article, said apparatus comprising means for rotating the article in its own plane to draw the strip onto a side face thereof, and hold-back means positioned at the side of the article and engaging said strip closely adjacent its position of progressive attachment to said side face.

11. Apparatus for applying a strip of sheet material to an annular article, said apparatus comprising means for rotating the article in its own plane, and a strip guiding member mounted in such position as to be closely adjacent the side face of the annular article mounted on said means, said guide member being adapted for the drawing of the strip thereabout, with an abrupt change of direction of the strip, as the latter, attached to the article, is drawn onto said article by the latter's rotation.

12. Apparatus for applying a strip of sheet material to an annular article, said apparatus comprising means for rotating the article in its own plane to draw the strip onto a side face thereof, means at the side of the article thereon for so guiding the strip as to cause it abruptly to change its course immediately before passing onto said face, and means for pressing the strip against said face.

13. Apparatus for applying a strip of sheet material to an annular article, said apparatus comprising a rotatable support for the article, a strip guide positioned at the side of the article thereon and adapted to guide a strip onto a side face of the article with an abrupt change of the direction of the strip closely adjacent the article, and a roller adapted to press the strip against the article as it is drawn thereonto by the rotation of the latter, said guide being so adjustable as to vary the direction of the strip's approach to the article.

14. Apparatus for applying a strip of sheet material to an annular article, said apparatus comprising a rotatable support for the article, a strip guide positioned at the side of the article thereon and adapted to guide a strip onto a side face of the article with an abrupt change of the direction of the strip closely adjacent the article, and a roller adapted to press the strip against the article as it is drawn thereonto by the rotation of the latter, said guide being so adjustable as to vary the lateral tilt of the strip as the latter approaches the article.

15. Apparatus for applying a strip of sheet material to an annular article, said apparatus comprising a rotatable support for the article, a strip guide positioned at the side of the article thereon and adapted to guide a strip onto a side face of the article with an abrupt change of the direction of the strip closely adjacent the article, and a roller adapted to press the strip against the article as it is drawn thereonto by the rotation of the latter, said guide being so adjustable as to vary the direction of approach and the lateral tilt of the strip.

16. Apparatus for applying a strip of sheet material to an annular article, said apparatus comprising a rotatable support for the article, a strip guide positioned at the side of an article thereon and adapted to guide a strip onto a side face of the article, and a roller adapted to press the strip against the article as it is drawn thereonto by the rotation of the latter, said guide comprising a plate over which the strip slides in flatwise contact and from which it passes with an abrupt change of direction.

17. Apparatus for applying a strip of sheet material to an annular article, said apparatus comprising a rotatable support for the article, a strip guide positioned at the side of the article thereon and adapted to guide a strip onto a side face of the article, and a roller adapted to press the strip against the article as it is drawn thereonto by the rotation of the latter, said guide comprising a plate over which the strip slides in flatwise contact and a side-guide for the strip mounted on said plate, the guiding face of said plate being approximately normal with relation to the side face of the article and radial with relation to the latter's axis.

18. Apparatus for applying a strip of sheet material to an annular article, said apparatus comprising means for rotating the article in its own plane, a roller adapted to press a strip onto a side face of the article as the latter is rotated, and means for guiding a strip with an abrupt change of direction at a point closely adjacent the side face of said article and closely adjacent said roller as the strip is drawn between the article and said roller.

19. Apparatus for applying a finishing strip to a tire, said apparatus comprising a rotatable tire-core chuck, a tire-core thereon, a roller adapted to press the outer marginal portion only of said strip as it passes onto the tire, and a finishing-strip guide about which the strip is drawn with an abrupt change of direction as it is drawn between said roller and the tire by the rotation thereof.

20. Apparatus as defined in claim 19 in which the roller is provided with a set of fluting pins adapted to press the strip against the bead of the tire.

In witness whereof I have hereunto set my hand this 1st day of August 1923.

WILLIAM F. RENNIE.